2,874,145
VINYL RESIN COMPOSITIONS STABILIZED WITH LEAD CHLORIDE-LEAD SILICATE COMPLEXES

John G. Hendricks, Boonton, N. J., and Adrian R. Pitrot, Uniondale, N. Y., assignors to National Lead Company, New York, N. Y., a corporation of New Jersey No Drawing. Application March 23, 1956
Serial No. 573,322

7 Claims. (Cl. 260—45.75)

This invention relates to vinyl resin compositions and more particularly to such compositions stabilized with respect to their resistance to the action of light and heat.

It is well-known that vinyl resin compositions are sensitive to the action of light and heat and that the acid degradation products produced by such action react to effect deterioration of the resin composition. This deterioration, primarily evidenced by color changes in the resin composition, which are in themselves undesirable, also seriously affects other physical characteristics of the resins such as flexibility and tensile strength. Since the resin compositions are necessarily exposed to heat during compounding and processing and to light during aging, it is desirable to incorporate agents which tend to stabilize the physical properties of the resin compositions.

Basic lead salts of various kinds have heretofore been employed as stabilizing agents for vinyl resin compositions. Among such basic lead salts may be mentioned, for example, dibasic lead phthalate, dibasic lead phosphite, basic carbonate white lead, basic silicate white lead and tri-basic lead sulfate, among others. While such basic lead salts have been quite successful as stabilizing agents, and have gained wide popularity in the trade for this purpose, they nevertheless suffer from certain disadvantages. In some instances these products are too reactive in that they react with organic colorants and with plasticizers leading to discoloration under severe conditions of service. The moisture resistance of some of the basic lead stabilizers is inadequate, under certain conditions, to achieve desired electrical properties after long-term water immersion. In addition, many of the above mentioned materials have high specific gravities which is undesirable in many applications, and are manufactured from rather costly raw materials which limit their use in applications where cost is critical.

It is an object of this invention, therefore, to provide improved vinyl halide resin compositions stabilized against the effects of light and heat. Another object is to provide stabilized vinyl halide resin compositions in which the stabilizer possesses improved inertness toward organic colorants and plasticizers. Still another object is to provide stabilized vinyl resin compositions having improved moisture resistance. A further object is to provide stabilized vinyl resins employing stabilizers having low specific gravities. A still further object is to provide stabilized vinyl resin compositions which may be economically manufactured and sold.

Broadly, this invention contemplates a vinyl halide resin containing a basic lead chloride-lead silicate complex as stabilizer therefor. In a particular desirable embodiment, this invention contemplates a vinyl halide resin composition containing about 0.5 to 20% by weight, based on the resin, of a basic lead chloride-lead silicate complex, said complex comprising from about 30 to about 90% total lead calculated as PbO, from about 5 to about 65% of silica, calculated as $SiO_2$ and from about 1 to about 6% chlorine, calculated as Cl.

Among the basic lead chloride-lead silicate complexes useful in the practice of the present invention are those described and claimed in U. S. Patent No. 2,379,270, June 26, 1945, to L. E. Barton, formed by heating together at elevated temperature a mixture of compounds which, upon heating, provide lead oxide, silica and halogen, said halogen being in combination with a cation which is volatilized at the temperature of heating.

The stabilizer may be introduced into the composition at any desired stage of manufacture, but is preferable to add it before or during the milling or mixing of the ingredients. It has been found that the basic lead chloride-lead silicate complexes disperse readily in the mixture of vinyl resin and other compounding agents so that a uniform dispersion is obtained. After mixing, the ingredients are fluxed and homogenized on a mill at conventional temperatures.

The basic lead chloride-lead silicate complex should preferably be present in amount between 0.5 and 20% by weight, based on the resin. Amounts lower than about 0.5%, although they exhibit some beneficial effect, do not in general exert sufficient stabilizing action to provide a commercially acceptable product, unless other stabilizers are used in conjunction therewith. Amounts over 20% of the lead chloride-lead silicate complex, on the other hand, are not ordinarily desirable, as they merely load the resin with large amounts of solids which do not serve any additional stabilizing purpose. Within the stated range optimum results are usually obtained using amounts of lead chloride-lead silicate complex between 2 and 7%, based on the weight of the resin.

By the term "vinyl halide resin" we mean to include the various vinyl resin compounds and combinations known to the art which normally include vinyl halide such as polyvinyl chloride; vinyl resins produced by conjointly polymerizing a vinyl halide with vinyl acetate or other vinyl ester; vinyl resins produced by conjoint polymerization with an acrylic compound, as for instance, ethyl methacrylate, or methyl methacrylate; and co-polymers of a vinyl halide with other vinyl halide resin copolymers as vinylidene halide.

The following examples illustrate this invention. In all examples, the preparations were carried out according to the following procedures:

PROCESSING METHOD FOR RESIN TESTS

The ingredients for the vinyl test compound were placed in a beaker and premixed thoroughly with a spatula and then added to a two roll even speed laboratory mill at 300° F. and fluxed and mixed in a 5 minute cycle. Six-mil films for light tests were calendered directly. Seventy-mil sheets were prepared to be used for heat stability and electrical tests. The 70-mil sheets were press polished by molding in a 30 minute cycle at 320° F. Heat stability studies were conducted by exposing test specimens at 300° F. in a circulating air oven. In several instances the extent of degradation was followed by noting the decrease in reflectance, due to color formation, using a Hunter reflectometer with a blue filter.

*Example 1*

A basic lead chloride-lead silicate complex was prepared by slurrying 16 parts of litharge (PbO) and 16 parts of silica in water and adding to the slurry 1.1 parts of hydrogen chloride in the form of a 37% aqueous solution. When the reaction was complete the slurry was dewatered on a filter and the filter cake was heated to approximately 490° C. and allowed to cool. The resulting lead chloride-lead silicate complex had the following composition:

| | Percent |
|---|---|
| Lead oxide (PbO) | 48.6 |
| Silica ($SiO_2$) | 48.6 |
| Chlorine (Cl) | 2.8 |

This complex was incorporated into a vinyl resin composition as follows:

A plastic composition consisting of 100 grams of polyvinyl chloride resin and 50 grams of di-2-ethylhexyl phthalate plasticizer was processed according to the processing method described above. A similar composition to which 5.0 grams of basic lead chloride-lead silicate complex stabilizer had been added was processed in the same way.

After press polishing at 320° F. the 70-mil sheet of the unstabilized composition was yellow-amber in color. Upon exposure to 300° F. in a circulating air oven it turned black in one hour. The composition stabilized with the basic lead chloride-lead silicate was light cream in color after the press polishing operation and showed no appreciable color change after 7 hours' exposure in a circulating air oven at 300° F.

Six-mil films of these compositions were mounted out of doors on test fences in the Long Island, New York, area to compare their light stability. After two weeks exposure the unstabilized film had spotted and become very tacky indicating that appreciable degradation had occurred. After 1 month exposure it was severely discolored. The film stabilized with the basic lead chloride-lead silicate complex showed no appreciable change after 1 month exposure.

Example 2

A mixture of 85 parts of lead oxide (PbO) and 15 parts of silica was wet milled with a solution of 5 parts of ammonium chloride. The slurry was de-watered by settling and decantation and the solids dried. The mixture was then calcined for three hours at 570 to 590° C. The resuling product had the following composition:

| | Percent |
|---|---|
| Lead oxide (PbO) | 80.8 |
| Silica (SiO$_2$) | 14.2 |
| Chlorine (Cl) | 5.0 |

Two plastic compositions were prepared consisting of 100 grams of polyvinyl chloride resin, 50 grams of "Paraplex G-50," which is a commercial high molecular weight polyester marketed as a plasticizer, by the Rohm and Haas Co., Philadelphia, Pa., and 5 grams of stabilizer. The stabilizer additive was varied as follows: (1) basic carbonate white lead, and (2) the above basic lead chloride-lead silicate complex. Processing was as described above. 70-mil press-polished sheets of these compositions were tested for heat stability at 300° F. in a circulating air oven. Hunter reflectometer reading using the blue filter were taken on the exposed samples with the results given in Table I.

TABLE I.—HEAT STABILITY OF STABILIZED VINYL COMPOSITIONS

| Hours at 300° F. | Percent reflectance— Hunter reflectometer | |
|---|---|---|
| | Basic carbonate white lead | Basic lead chloride-lead silicate |
| 0 | 57 | 56 |
| 2 | 26 | 44 |
| 4 | 14 | 43 |
| 6 | 11 | 38 |
| 8 | 10 | 34 |

Example 3

Two compositions were prepared and tested as in Example 2. They consisted of 100 grams of polyvinyl chloride resin, 25 grams of tricresyl phosphate plasticizer, 25 grams of "Paraplex G-25," another commercial polyester plasticizer, supplied by the Rohm and Haas Co., and 5 grams of stabilizer. In this case, the stabilizer additive was varied between (1) the basic lead chloride-lead silicate of Example 2, and (2) basic silicate white lead. A comparison of the heat stability of 70-mil press-polished sheets of these compositions is given in Table II.

TABLE II.—HEAT STABILITY OF STABILIZED VINYL COMPOSITIONS

| Hours at 300° F. | Percent reflectance— Hunter reflectometer | |
|---|---|---|
| | Basic lead chloride-lead silicate | Basic silicate white lead |
| 0 | 38 | 26 |
| 2 | 36 | 25 |
| 4 | 34 | 17 |
| 6 | 33 | 16 |

The results set forth in Table II indicate that basic lead chloride-lead silicate complexes according to this invention provide substantially improved heat stability over the commercial basic silicate of white lead.

Example 4

Two vinyl electrical insulation compounds were prepared from 100 grams of polyvinyl chloride resin, 50 grams of di-2-ethylhexyl phthalate plasticizer, 10 grams of electrical grade clay and 0.5 gram of stearic acid lubricant. In one composition 7 grams of basic lead chloride-lead silicate complex stabilizer according to Example 2 was employed, while in the second composition 7 grams of basic silicate white lead stabilizer was added. These compositions were processed into 70-mil press-polished sheets and volume resistivities at 50° C. determined. The formulation stabilized with basic lead chloride-lead silicate had a volume resistivity of $61 \times 10^{12}$ ohm-cm., while the volume resistivity of the composition stabilized with basic silicate white lead was $38 \times 10^{12}$ ohm-cm.

Example 5

Approximately 30 grams each of the basic lead chloride-lead silicate complex of Example 2 and basic silicate of white lead were accurately weighed into shallow glass dishes and placed in a bell jar containing water at 25° C. The samples were removed at intervals, weighed and the percent gain in weight due to absorption of water determined. The results of this test are given in Table III.

TABLE III.—MOISTURE ABSORPTION OF VINYL STABILIZERS

| Stabilizer | Percent gain in weight | | |
|---|---|---|---|
| | 1 day | 4 days | 10 days |
| Basic lead chloride-lead silicate | 0.17 | 0.20 | 0.34 |
| Basic silicate white lead | 0.40 | 0.68 | 1.02 |

Thus, the basic lead chloride-lead silicate stabilizers, after 10 days at high humidity, absorbs only about one-third as much moisture as basic silicate white lead. This indicates that vinyl resins stabilized with basic lead chloride-lead silicates can be expected to exhibit superior moisture resistance. The following example substantiates this expectation.

Example 6

Two electrical compositions were prepared from polyvinyl chloride-vinyl acetate (95:5) copolymer resin. In one case the compound contained 3% basic silicate of white lead and in the second compound 3% basic lead chloride-lead silicate stabilizer was employed. These compositions were extruded onto copper wire and the wire immersed in water for a period of 18 weeks after which time the electrical properties were determined. The compound stabilized with basic silicate of white lead had a resistivity of 80 megohms per 1000 ft. of wire. The insulation stabilized with basic lead chloride-lead silicate had a resistivity of 140 megohms per 1000 ft. of wire.

It is apparent that the present invention provides vinyl halide resin compositions which are substantially improved with respect to their resistance to the effects of heat and light. A variety of plasticizers, coloring and modifying agents may also be employed in these compositions as will be understood by those skilled in the art.

While the present invention has been described with reference to certain specific embodiments and illustrated by means of certain examples, no undue limitations are to be reduced therefrom, and the invention is not to be limited except as set forth in the appended claims.

We claim:

1. A polyvinyl halide polymer composition containing from about 0.5 to 20%, based on the weight of said polymer, of a basic lead chloride-lead silicate cocalcined composition, said composition comprising from about 30 to about 90% total lead calculated as PbO, from about 5 to about 65% silica, calculated as $SiO_2$, and from about 1 to about 6% chlorine, calculated at Cl.

2. A polyvinyl halide polymer composition containing, as stabilizer therefor, from about 0.5 to 20%, based on the weight of said polymer, of a basic lead chloride-lead silicate cocalcined composition, said composition comprising lead oxide, silica and chlorine.

3. A polyvinyl halide polymer composition comprising from about 2 to about 7%, based on the weight of said polymer, of a basic lead chloride-lead silicate cocalcined composition, said composition comprising from about 30 to about 90% total lead calculated as PbO, from about 5 to about 65% silica, calculated as $SiO_2$, and from about 1 to about 6% chlorine, calculated as Cl.

4. The process of stabilizing a polyvinyl halide polymer composition, which comprises incorporating therein a basic lead chloride-lead silicate composition, said cocalcined composition comprising from about 30 to about 90% total lead calculated as PbO, from about 5 to about 65% silica, calculated as $SiO_2$, and from about 1 to about 6% chlorine, calculated as Cl.

5. Process according to claim 4, in which said basic lead chloride-lead silicate cocalcined composition is incorporated in amount between about 0.5 and about 20% based on the weight of said resin.

6. Process according to claim 4, in which said basic lead chloride-lead silicate cocalcined composition is present in amount between about 2 and about 7%, based on the weight of said resin.

7. A polyvinyl halide polymer containing, as stabilizer therefor, a cocalcined composition consisting essentially of basic lead chloride and lead silicate.

References Cited in the file of this patent

UNITED STATES PATENTS

| | | |
|---|---|---|
| 2,179,973 | Alexander | Nov. 14, 1939 |
| 2,379,270 | Barton | June 26, 1945 |